United States Patent Office 3,515,686
Patented June 2, 1970

3,515,686
ELECTRICALLY CONDUCTIVE ZINC OXIDE
Robert S. Bowman, Pittsburgh, Pa., assignor to St. Joseph Lead Company, New York, N.Y., a corporation of New York
No Drawing. Filed Aug. 2, 1967, Ser. No. 657,779
Int. Cl. H01b 1/08
U.S. Cl. 252—512                                       6 Claims

ABSTRACT OF THE DISCLOSURE

Normally non-conductive zinc oxide is converted into an electrically conductive form by heating zinc oxide in the presence of an oxide of aluminum, gallium, indium, germanium or tin or a precursor thereof convertible into such oxide under the conditions of treatment and of zinc or magnesium vapor.

---

The invention relates to the production of electrically conductive zinc oxide.

I have previously found that normally non-conductive zinc oxide, either French or American process, can be converted into an electrically conductive form by heating the zinc oxide for a relatively short time to a temperature in the range of from about 600° C. to about 900° C. in admixture with an oxide of aluminum, gallium, indium, germanium or tin or a precursor thereof convertible into such oxide under the conditions of treatment. Preferably the heating is carried out in a reducing atmosphere except when germanium or lower valence oxides of germanium or tin are used as the activating substance, in which case the use of a non-oxidizing atmosphere such as nitrogen or argon is sufficient to convert the zinc oxide to an electrically conducting form. The neutral atmosphere may be argon or nitrogen and the reducing atmosphere may be hydrogen or carbon monoxide or a mixture of nitrogen with hydrogen or carbon monoxide, for example, in the proportion of from about 5 to about 50 mole percent of hydrogen or carbon monoxide.

The activating substances are used in relatively small proportions of the order of from about 0.01 to about 5.0 atom percent based on the zinc oxide and, in general, amounts of the activating substances in the range of from about 0.03 to about 1.0 atom percent are preferred. The oxides or their precursors may be mixed with the zinc oxide in the dry form prior to the heating operation. Preferably such mixtures are sprayed with water in the mixer in an amount, for example, of about 5 parts by weight of water to 20 parts by weight of the mixture to give a damp powder which is dried in air before being heated. When water soluble precursors, such as stannous sulfate, are used they are preferably dissolved in water, for example, in about 5 parts by weight of water to 20 parts by weight of zinc oxide, and the solution sprayed on the zinc oxide in a mixer to give a damp powder which is then air dried before being heated.

The mixture of zinc oxide and activating agent is heated to the desired temperature in a neutral or reducing atmosphere. The heating may be carried out in refractory reactor tubes either batchwise or in continuous flow through the reactor tubes. In general, a heating period of about 15 minutes is sufficient. The product is preferably allowed to cool to room temperature in the neutral or reducing atmosphere.

I have now found that the conversion of the zinc oxide to the conductive form may be facilitated and the use of hazardous gaseous reducing agents may be eliminated by the use of a processing atmosphere containing zinc or magnesium vapor in a non-oxidizing carrier gas, for example, from about 1 to about 20 volume percent of the metal vapor in nitrogen. The metal vapor may be injected into the carrier gas stream by vaporizing the metal from a graphite cell opening into the carrier gas conduit prior to its passage into the treating zone or by admixing granules of the metal with the zinc oxide, containing the activating substance. In the latter procedure the residual metal granules are removed from the treated zinc oxide by sieving or by flotation of the oxide in a stream of air or other gas. When the activating substance is aluminum oxide, both the aluminum and the zinc or magnesium vapor may be introduced into the zinc oxide treating zone in a stream of carrier gas by passing a current of nitrogen, for example, through a heated graphite cell containing a zinc-aluminum or a magnesium-aluminum alloy.

The following table gives illustrative examples of the method of the invention carried out with various activating agents and metal vapors and under various conditions:

| Activator | Atom, percent activator | Processing temp., ° C. | Source of metal vapor | D.C. resistivity ohm-cm |
|---|---|---|---|---|
| $Al_2(SO_4)_3$ | 0.6 | 800 | (1) | $1.1 \times 10^3$ |
| $Ga_2O_3$ | 0.6 | 800 | (1) | 19 |
| $Ga_2O_3$ | 0.06 | 800 | (1) | $4.4 \times 10^2$ |
| $Ga_2O_3$ | 0.06 | 800 | (2) | $2.1 \times 10^2$ |
| $Ga_2O_3$ | 0.6 | 800 | (3) | 11 |
| $Ga(NO_3)_3$ | 0.3 | 750 | (1) | 24 |
| $In(OH)_3$ | 0.6 | 800 | (1) | $1.3 \times 10^2$ |
| $In_2O_3$ | 0.6 | 800 | (1) | $1.1 \times 10^3$ |
| $In(NO_3)_3$ | 0.3 | 750 | (1) | 43 |
| $Al(NO_3)_3$ | 0.6 | 800 | (1) | $2.4 \times 10^2$ |
| Al vapor | | 850 | (4) | $9.0 \times 10^3$ |
| Al vapor | | 850 | (5) | $1.0 \times 10^4$ |
| $GeO_2$ | 0.15 | 750 | (1) | 11 |
| $GeO_2$ | 0.15 | 700 | (2) | 1 |
| $SnO_2$ | 0.6 | 850 | (1) | $1.0 \times 10^2$ |
| $SnSO_4$ | 0.6 | 850 | (1) | 33 |

1 From zinc granules contained in a graphite cell just upstream of the body of zinc oxide.
2 From zinc granules admixed with the zinc oxide.
3 From magnesium granules contained in a graphite cell just upstream of the body of zinc oxide.
4 From a zinc-aluminum alloy (22 wt. percent aluminum).
5 From a magnesium-aluminum alloy (50 wt. percent aluminum).

The term "atom percent" as used in the specification and claims hereof designates the atoms of activator metal per 100 molecules of zinc oxide.

I claim:
1. A method of preparing electrically conductive zinc oxide which comprises heating zinc oxide to a temperature of from about 600° C. to about 900° C. in a non-oxidizing atmosphere in the presence of an oxide of aluminum, gallium, indium, germanium or tin or a precursor thereof convertible into such oxide under the conditions of treatment in an amount equivalent to from about 0.01 to about 5.0 atom percent based on the zinc oxide and of zinc or magnesium vapor in an amount upwards of about 1 volume percent of the atmosphere.

2. A method of preparing electrically conductive zinc oxide as defined in claim 1 wherein zinc or magnesium vapor is introduced into the heated zinc oxide in a carrier stream of non-oxidizing gas.

3. A method of preparing electrically conductive zinc oxide as defined in claim 1 wherein the precursor comprises the vapor of a zinc aluminum alloy and is brought into contact with the heated zinc oxide in a carrier stream of non-oxidizing gas.

4. A method of preparing electrically conductive zinc oxide as defined in claim 1 wherein the precursor comprises the vapor of a magnesium aluminum alloy and is brought into contact with the heated zinc oxide in a carrier steam of non-oxiding gas.

5. A method of preparing electrically conductive zinc oxide as defined in claim 1 wherein granules of metallic zinc are admixed with the zinc oxide prior to the heating thereof.

6. A method of preparing electrically conductive zinc oxide as defined in claim 1 wherein granules of metallic magnesium are admixed with the zinc oxide prior to the heating thereof.

References Cited

UNITED STATES PATENTS

| 2,887,632 | 5/1959 | Dalton | 252—512 |
| 3,089,856 | 5/1963 | Cyr | 252—501 |
| 3,264,229 | 8/1966 | Klein | 252—518 |

DOUGLAS J. DRUMMOND, Primary Examiner

U.S. Cl. X.R.

106—296; 252—518